United States Patent
Korn

[11] Patent Number: 5,828,700
[45] Date of Patent: Oct. 27, 1998

[54] ADAPTIVE EQUALIZER CIRCUIT

[75] Inventor: Thomas H. Korn, San Jose, Calif.

[73] Assignee: Micro Linear Corporation, San Jose, Calif.

[21] Appl. No.: 102,695

[22] Filed: Aug. 5, 1993

[51] Int. Cl.$^6$ ............................... H03H 7/30; H03H 7/40
[52] U.S. Cl. ...................... 375/232; 375/257; 364/724.2; 333/28 R
[58] Field of Search .................. 375/11, 14, 15, 375/12, 36, 229, 230, 232, 235, 257; 364/724.19, 724.2; 333/166, 18, 28 R

[56] References Cited

U.S. PATENT DOCUMENTS

| | | | |
|---|---|---|---|
| 3,336,540 | 8/1967 | Kwartiroff et al. | 333/28 R |
| 3,727,136 | 4/1973 | Schroeder et al. | 325/320 |
| 3,728,649 | 4/1973 | Waldhauer | 333/18 |
| 3,758,881 | 9/1973 | Rummler | 333/16 |
| 4,035,725 | 7/1977 | Guidoux | 325/42 |
| 4,149,259 | 4/1979 | Kowalski | 364/724 |
| 4,250,458 | 2/1981 | Richmond et al. | 329/112 |
| 4,459,698 | 7/1984 | Yumoto et al. | 375/16 |
| 4,553,248 | 11/1985 | Reed | 375/14 |
| 4,555,788 | 11/1985 | Merrill | 375/11 |
| 4,771,456 | 9/1988 | Martin et al. | 380/10 |
| 4,791,390 | 12/1988 | Harns et al. | 364/724.19 X |
| 5,058,047 | 10/1991 | Chung | 364/724.19 |
| 5,257,286 | 10/1993 | Ray | 375/120 |
| 5,278,777 | 1/1994 | Cummins | 364/724.19 X |
| 5,337,025 | 8/1994 | Polhemus | 333/28 R |

OTHER PUBLICATIONS

R. L. Geiger and E. Sánchez–Sinencio; "Active Filter Design Using Operational Transconductance Amplifiers: A Tutorial", IEEE Circuits and Devices; Mar. 1985, pp. 20–32.
Yoshitaka Takasaki; Digital Transmission Design and Jitter Analysis; 1991 Artech House, Inc., pp. 71–81.

*Primary Examiner*—Stephen Chin
*Assistant Examiner*—Bryan Webster
*Attorney, Agent, or Firm*—Haverstock & Associates

[57] ABSTRACT

An adaptive equalizer is configured to reconstruct electronic signals which are transmitted over signal cables, such as twisted pair cables. The equalizer satisfactorily reconstructs the signals over a broad range of cable lengths. The degradation characteristics of a signal cable varies with cable length. Using the degradation characteristics for a cable over a desired range of lengths, the adaptive equalizer includes multiple parallel paths each of which are configured to reconstruct the input voltage signal optimized for a particular cable length. The degraded input signal is split according to a predetermined relationship into multiple partial signals, each signal for transmission through one each of the paths. Though each path is optimized to reconstruct the signal for a particular length of cable, the adaptive control adds a function of the actual cable length for more accurately reconstructing the signal. Each path forms a partial reconstructed signal. In the preferred embodiment, there are two paths, one of which does not modify its partial signal. The partial signals from each path are summed to form a composite reconstructed signal.

19 Claims, 12 Drawing Sheets

Eye Diagrams

Unequalized

Equalized

25m

50m

75m

100m

ADAPTIVE EQUALIZER CIRCUIT

FIELD OF THE INVENTION

This invention relates to the field of equalizer circuits. More particularly, this invention relates to the field of equalizer circuits which are adaptable for selectively optimizing the elimination of noise, jitter, attenuation, ringing, interference coupling and other losses for predetermined cable lengths.

BACKGROUND OF THE INVENTION

As is well known, signals can degrade as they are transmitted from a transmitter circuit to a receiver circuit via signal lines. Such degradation is generally a function of the quality, grade, gauge and length of the cable. In transmitting digital information, the degradation can be sufficiently severe that one or more bits are lost. To overcome the effects of electrical signal transmission, there are essentially two primary techniques for avoiding the deleterious effects of signal degradation: 1) prevent the signal from degrading or 2) reconstruct the original signal from that received. To prevent the signal from degrading, some practitioners have used high grade shielded cable for such applications as local area networks communicating over coaxial signal cable. Still others have eliminated the electrical cable entirely and used optical signal cable (fibre optics). Such transmission media are significantly more expensive than conventional wire.

For local area networks, system designers and users prefer to use twisted pair signal wires. Telephone equipment installers typically install telephones with cable having four wires, only two of which are needed for the telephone signal. The remaining two wires which are typically not used are automatically installed to every location where there is a telephone. Thus, using this extra twisted pair of wires can be extremely inexpensive if the problems associated with degraded signals can be overcome.

To reconstruct a transmitted signal from a received signal, others have characterized the typical signal degradation and attempted to perform an inverse degradation operation. Such inverse operations can be performed at either the transmitting or the receiving end of the signal cable. As a simplistic example, assume that it is known that a particular signal cable attenuates the voltage in a signal that is transmitted by 50%, i.e., cuts the signal in half. If a 10 volt signal is transmitted, a 5 volt signal will be received. To correct for this known degradation, a system designer could amplify the received 5 volt signal by a factor of two at the receiving end of the signal cable and apply the resulting 10 volt signal to the receiver circuit. In the alternative, the system designer could amplify the 10 volt signal at the output of the transmitter circuit and apply the resulting 20 volt signal to the signal cable. Due to the degradation in the signal cable, the receiver circuit receives the desired 10 volt signal.

An example of a reconstruction circuit used by others is shown in FIG. 1. A signal is applied to the input terminal 100 of the circuit and is coupled to a first terminal of an input impedance $Z_1$. The second terminal of the input impedance $Z_1$ is coupled to a positive input of an amplifier 102. The negative terminal of the amplifier 102 is coupled to ground. A feedback impedance $Z_2$ is coupled between the output of the amplifier 102 and the positive input. Either $Z_1$, $Z_2$ or both are controllable for adjusting the amount of reconstruction to the signal. This reconstruction circuit may be coupled to either the transmitting or receiving end of the signal cable, but typically to the transmitting end.

In another approach, the signal is coupled to the inputs of a differential amplifier as shown in FIG. 2. In particular, each of the two conductors of the signal cable are differentially coupled to one of the two inputs 104 and 106 of the circuit. A first input 104 is coupled to the base of a first NPN bipolar transistor 108. A second input 106 is coupled to the base of a second NPN bipolar transistor 110. The collector of the first transistor 108 is coupled to an impedance load $Z_{10}$ which in turn in coupled to a supply voltage V. Similarly, the collector of the second transistor 110 is coupled to an impedance load $Z_{12}$ which in turn in coupled to the supply voltage V. The emitter of the transistor 108 is coupled to a first terminal of a two terminal impedance load $Z_{14}$ and to a current source 112 which in turn in coupled to ground. Similarly, the emitter of the transistor 108 is coupled to a first terminal of a two terminal impedance load $Z_{14}$ and to a current source 112 which in turn in coupled to ground.

Generally, with such circuits, the impedance of the load $Z_{10}$ will equal the impedance of the load $Z_{12}$. The transfer function of the circuit can be expressed as:

$$\frac{V_{out}}{V_{in}} \cong 2\frac{Z_{10}}{Z_{14}}$$

Using techniques such as these, it is possible to optimize a circuit precisely designed to correct for a known cable with precisely understood degradation characteristics. However, for such applications local area networks, the users typically do not have the expertise to design such a circuit. It is clear that the expense of commissioning such a solution for each node on a network would be prohibitive. Further, it would be an unacceptable solution to restrict each resident on a network to a location within 25 meters of each other. What is needed is a general purpose equalizer which can satisfactorily reconstruct electronic signals transmitted over cables having a broad range of lengths. Preferably the circuit would provide an integrated solution to the problem.

SUMMARY OF THE INVENTION

An adaptive equalizer is configured to reconstruct electronic signals which are transmitted over signal cables, such as twisted pair cables. The equalizer satisfactorily reconstructs the signals over a broad range of cable lengths. The degradation characteristics of a signal cable varies with cable length. Using the degradation characteristics for a cable over a desired range of lengths, the adaptive equalizer includes multiple parallel paths each of which are configured to reconstruct the input voltage signal optimized for a particular cable length. The degraded input signal is split according to a predetermined relationship into multiple partial signals, each signal for transmission through one each of the paths. Though each path is optimized to reconstruct the signal for a particular length of cable, the adaptive control adds a function of the actual cable length for more accurately reconstructing the signal. Each path forms a partial reconstructed signal. In the preferred embodiment, there are two paths, one of which does not modify its partial signal. The partial signals from each path are summed to form a composite reconstructed signal.

BRIEF DESCRIPTION OF THE APPENDIX

Appendix A is a data sheet for a transceiver integrated circuit manufactured by Micro Linear Corporation located at 2092 Concourse Drive, San Jose, Calif. 95131 which incorporates the present invention. Micro Linear is a registered trademark of Micro Linear Corporation.

DETAILED DESCRIPTION OF THE PREFERRED EMBODIMENT

Figure 1:
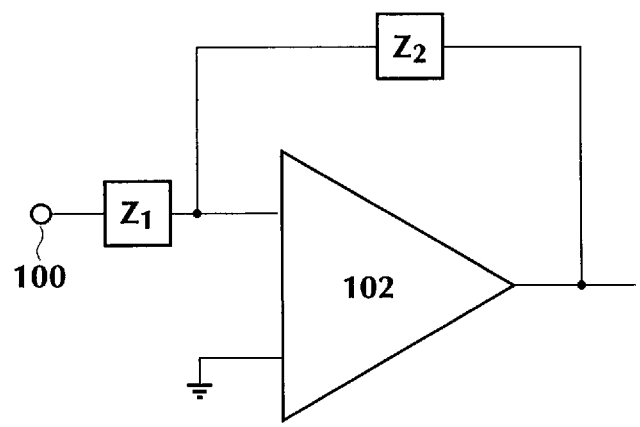
FIG. 1 is a block diagram of a prior art signal reconstruction circuit.
Figure 2:
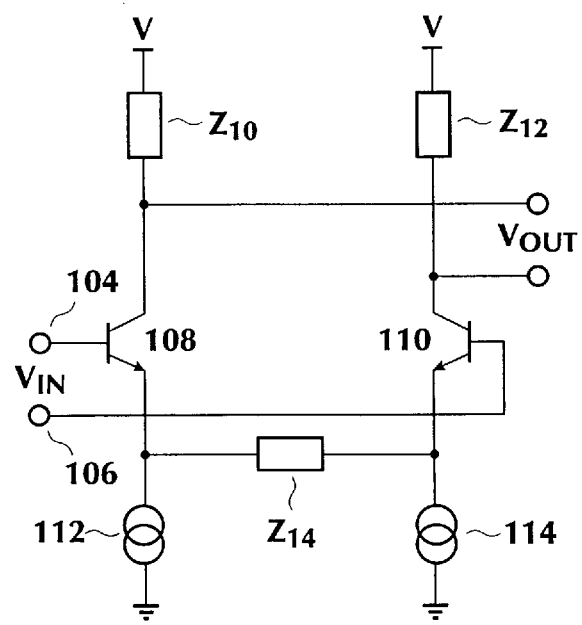
FIG. 2 is a schematic diagram of another prior art signal reconstruction circuit.
Figure 3:
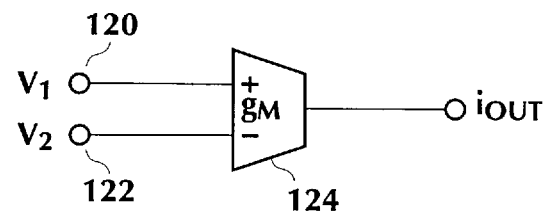
FIG. 3 is a block diagram of a simplified equalizer.

FIG. 3 shows a basic transconductor block diagram. A first voltage signal $V_1$ is coupled to a positive input 120 of the transconductor 124 and a second voltage is coupled to a negative input 122. The transconductor 124 has a transconductance of gm. The output of the transconductor is a current signal having a relationship to the input voltages described by the equation:

$$i_{out} = gm(V_1 - V_2)$$

Figure 4:
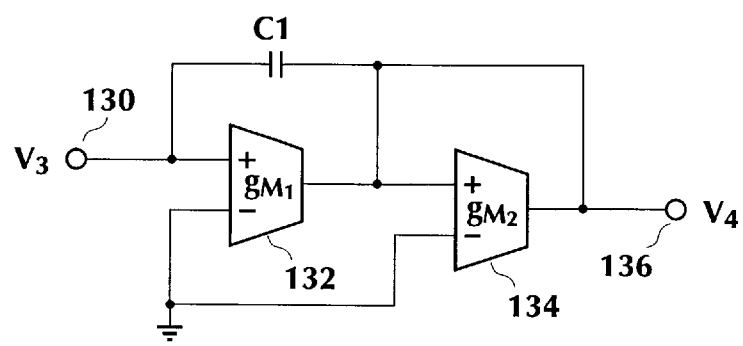
FIG. 4 is a basic equalizer block formed of two basic transconductance blocks such as those in FIG. 3.

FIG. 4 shows a basic equalizer block formed of two basic transconductor blocks such as those in FIG. 3. An input voltage $V_3$ is coupled to an input 130 terminal of the equalizer block for producing an output voltage $V_4$ on an output terminal 136. The input terminal 130 is coupled to the positive terminal of a first transconductor 132 having a transconductance of $gm_1$. The negative terminal of the first transconductor 132 is coupled to ground. The output of the first transconductor 132 is coupled to the negative terminal of a second transconductor 134 having a transconductance of $gm_2$. The positive terminal of the second transconductor 134 is coupled to ground. The output terminal 136 is coupled as a feedback signal to the negative input of the second transconductor 134 and through a feedback capacitor to the positive input of the first transconductor 132. The ratio of the output voltage $V_4$ to the input voltage $V_1$ can be described by the equation:

$$\frac{V_2}{V_1} = \frac{gm_1}{gm_2} \left( \frac{\frac{C_1}{gm_1} + 1}{\frac{C_1}{gm_2} + 1} \right)$$

Figure 5:
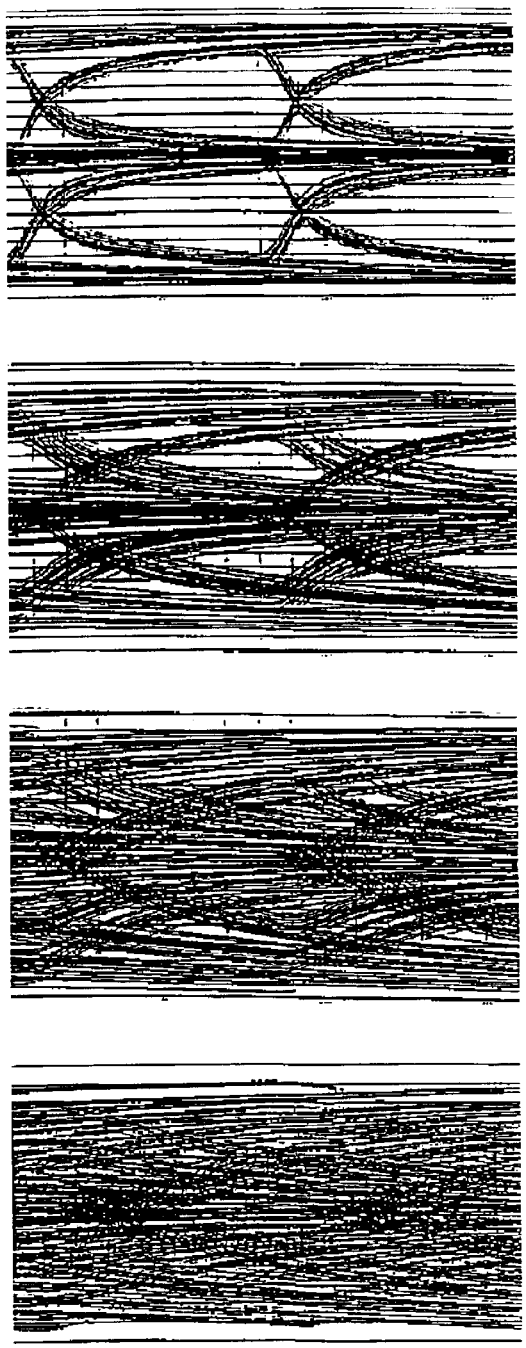
FIG. 5 shows performance charts for various cable lengths using the present invention.
Figure 5:
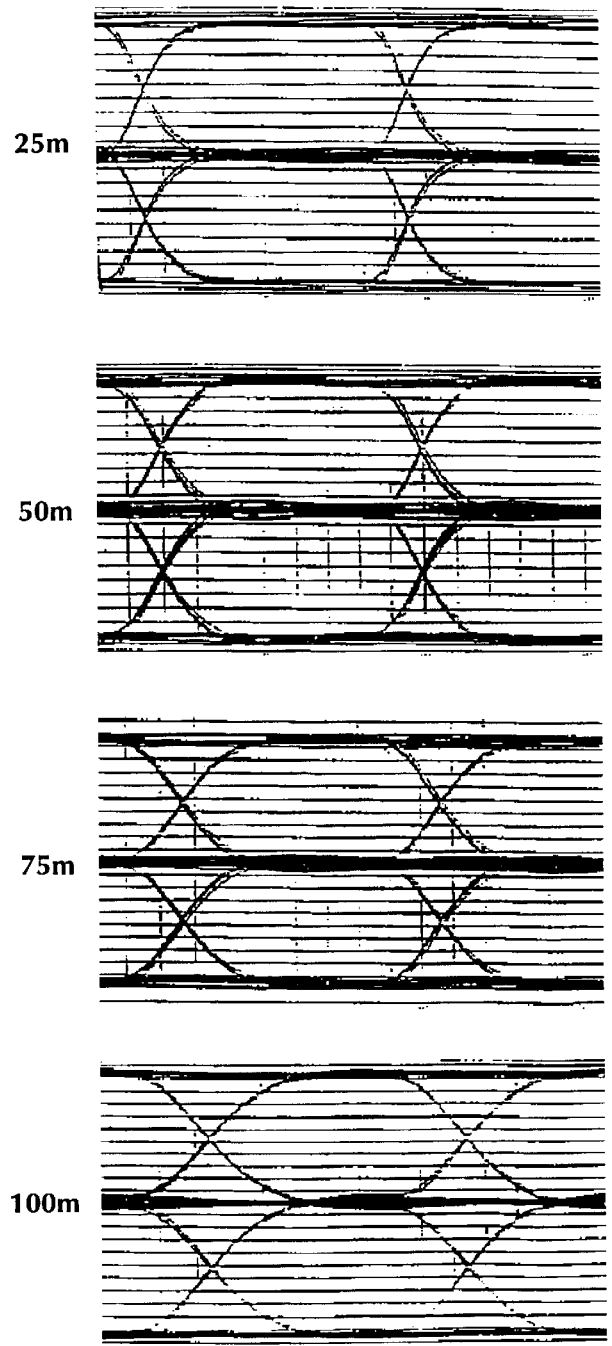

As is well known, the degradation of a signal along a signal cable is a function of the length of the cable. In particular, the longer the cable, the more the received signal degrades. This is clearly demonstrated in FIG. 5 which shows a measured signal for a clock type signal over 25, 50 75 and 100 meters of twisted pair cable without any equalization and the corresponding measurements made after equalization with a device of the type according to the present invention.

Figure 6:
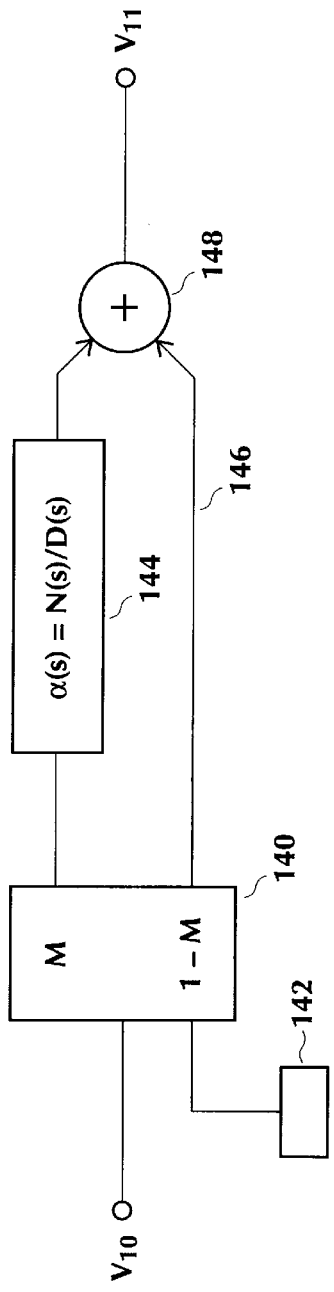
FIG. 6 is a block diagram of the preferred embodiment of the present invention.

Using standard design techniques, it is possible to optimize a circuit for a specific length of cable. According to the present invention, more than one path is included in the adaptive equalizer. Each path is configured to optimally reconstruct the signal for a predetermined cable length. FIG. 6 shows a block diagram of the adaptive equalizer of the preferred embodiment. According to the invention, the adaptive equalizer is positioned at the receiving end of the signal cable. The input voltage $V_{10}$ is the signal degraded by the signal cable and is coupled to a splitter circuit 140. The output voltage $V_{11}$ is the reconstructed voltage. The splitter is coupled for control by an adaptive control circuit to appropriately split the degraded signal between the two paths. For certain applications, more paths which are configured for optimization at other cable lengths may be used to improve the fidelity of the signal reconstruction. In the example shown in FIG. 6, the splitter 140 splits the input signal $V_{10}$ between the two paths. This split operates under control of the adaptor control 142 and is related to the length of the cable. In the preferred embodiment, the controller 142 operates to automatically determine the appropriate split between the two paths. The controller 142 includes a stored expected waveform signal which it compares against the reconstructed signal. The controller 142 adjusts the splitter relative to the error between the reconstructed signal and the stored reconstructed signal to minimize the error. Naturally, other types of controllers may be employed pursuant to the present invention including a manually adjusted splitter.

In the preferred embodiment, the two paths are optimized for cable lengths of 0 meters and 100 meters. This selection appears to provide the best two-path reconstruction for all cable lengths from 0 to about 125 meters. The portion of the signal coupled through the upper path 144 of FIG. 6 is reconstructed by a factor of a(s) which equals a fraction N(s)/D(s) (numerator/denominator). The portion of the signal coupled through the lower path 146 in the preferred embodiment is not multiplied by any factor. Note that the splitter sends a portion of the signal M through the upper path 144 and 1-M of the signal through the lower path 146. The partially reconstructed signals from each of the paths are summed in the summing circuit 148. Accordingly:

$$\frac{V_{11}}{V_{10}} = M \left( \frac{N(s)}{D(s)} \right) + (1 - M) = \frac{M(N(s) - D(s)) + D(s)}{D(s)}$$

The first expression in the central segment of the equation, M(N(s)/D(s)), represents the contribution to the reconstructed signal from the upper path 144. The second segment in the central segment of the equation, (1-M) represents the contribution to the reconstructed signal from the lower path 146. The third segment of the equation solves the second segment over a single common denominator. The numerator of the expression in the third segment of the equation above represents the zeros and the denominator represents the poles for the circuit. Only the denominator is a function of M. As can be seen from the circuit schematic of FIGS. 8 and 9, the circuit elements can be selected to properly adjust for the amplitude and phase degradations which are anticipated as a result of proper and careful characterization of the signal cable.

Figure 7:
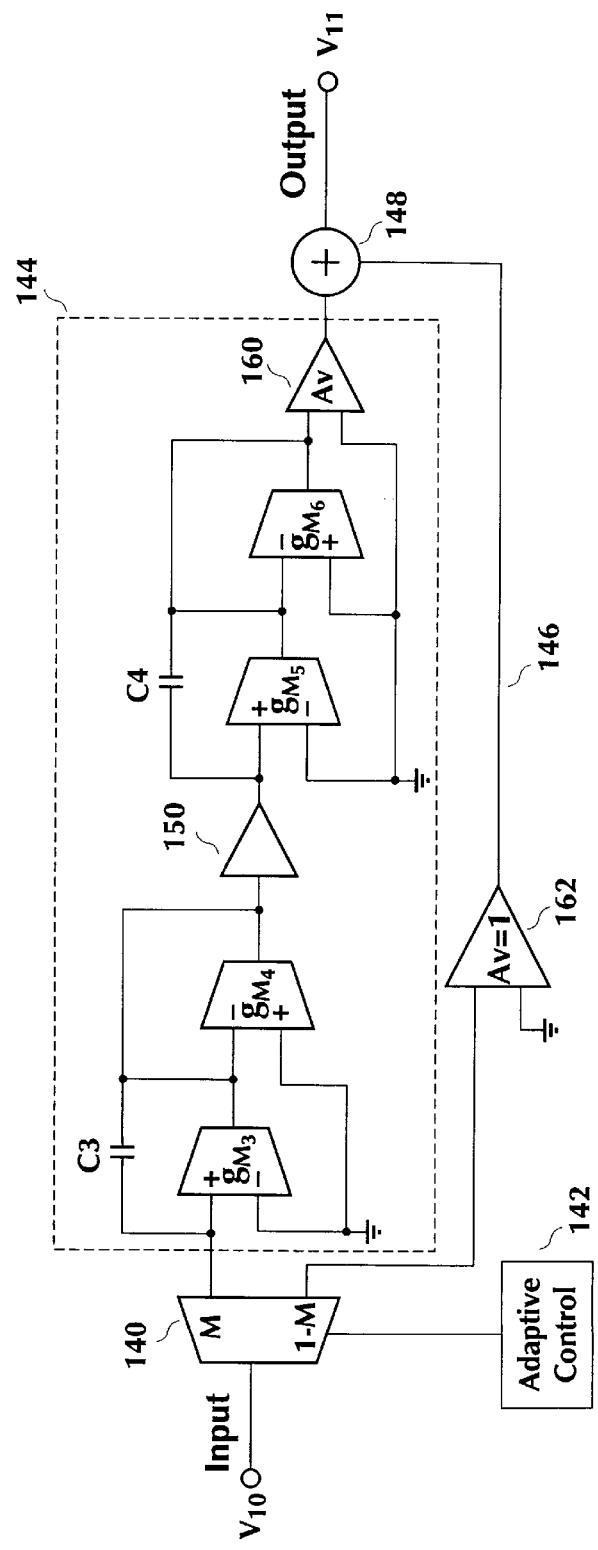
FIG. 7 is a more detailed block diagram of the circuit of FIG. 6 showing the preferred embodiment of the present invention.

FIG. 7 shows a more detailed block diagram for the adaptive equalizer shown in FIG. 6. Similar reference numerals will be used for the similar elements of both FIGS. 6 and 7. An input voltage signal $V_{10}$ is applied to the input of the splitter circuit 140. The splitter 140 operates to split the input voltage signal $V_{10}$ according to a function of M under control of an adaptive control circuit 142. As in FIG. 6, there are two signal reconstruction paths 144 and 146.

The upper path reconstructs the signal through it according to M(N(s)/D(s)). It includes a transconductor $gm_3$ having a positive input coupled to receive its portion of the input signal from the splitter 140. The negative input of the transconductor $gm_3$ is coupled to ground. The output of the transconductor $gm_3$ is coupled to its positive input through a capacitor C3. The output of the transconductor $gm_3$ is also coupled to the negative input of the transconductor $gm_4$. The output of the transconductor $gm_4$ is also coupled to its negative input and to the input of a buffer 150. The output of the buffer 150 is coupled to the positive input of a transconductor $gm_5$. The negative input of the transconductor $gm_5$ is coupled to ground. The output of the transconductor $gm_5$ is coupled to its positive input through a capacitor C4. The output of the transconductor $gm_5$ is also coupled to the negative input of the transconductor $gm_6$. The output of the transconductor $gm_6$ is also coupled to its negative input and to the positive input of an amplifier 160. The negative input of the amplifier 160 is coupled to ground. The output of the amplifier 160 is coupled to the summing circuit 148.

The lower path 146 reconstructs the signal through it by a factor of 1. It includes a gain of one amplifier 162 having its positive input coupled to receive its portion of the input voltage signal $V_{10}$ from the splitter 140. The negative input of the amplifier 162 is coupled to ground. The output of the amplifier 162 is coupled to the summing circuit 148. The output of the summing circuit is the reconstructed voltage signal $V_{11}$. FIGS. 3, 4, 6 and 7 show single ended circuits for the sake of simplicity of understanding the invention. However, from the detailed circuit diagrams described below, it will be apparent to one of ordinary skill in the art that the preferred embodiment is implemented using differential signals.

Figure 8:
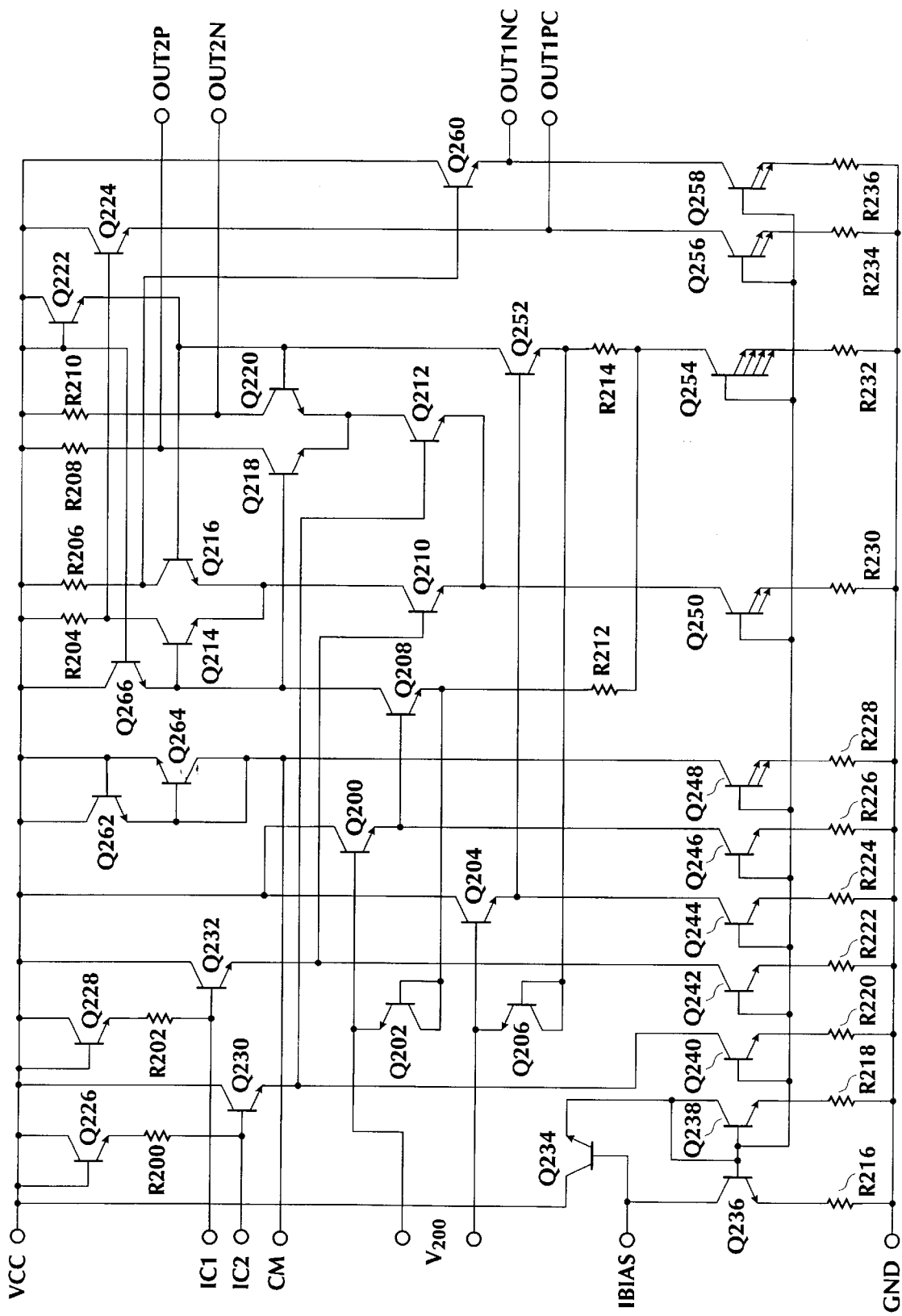
FIG. 8 shows a more detailed circuit schematic of the splitter of FIG. 7.
Figure 9:
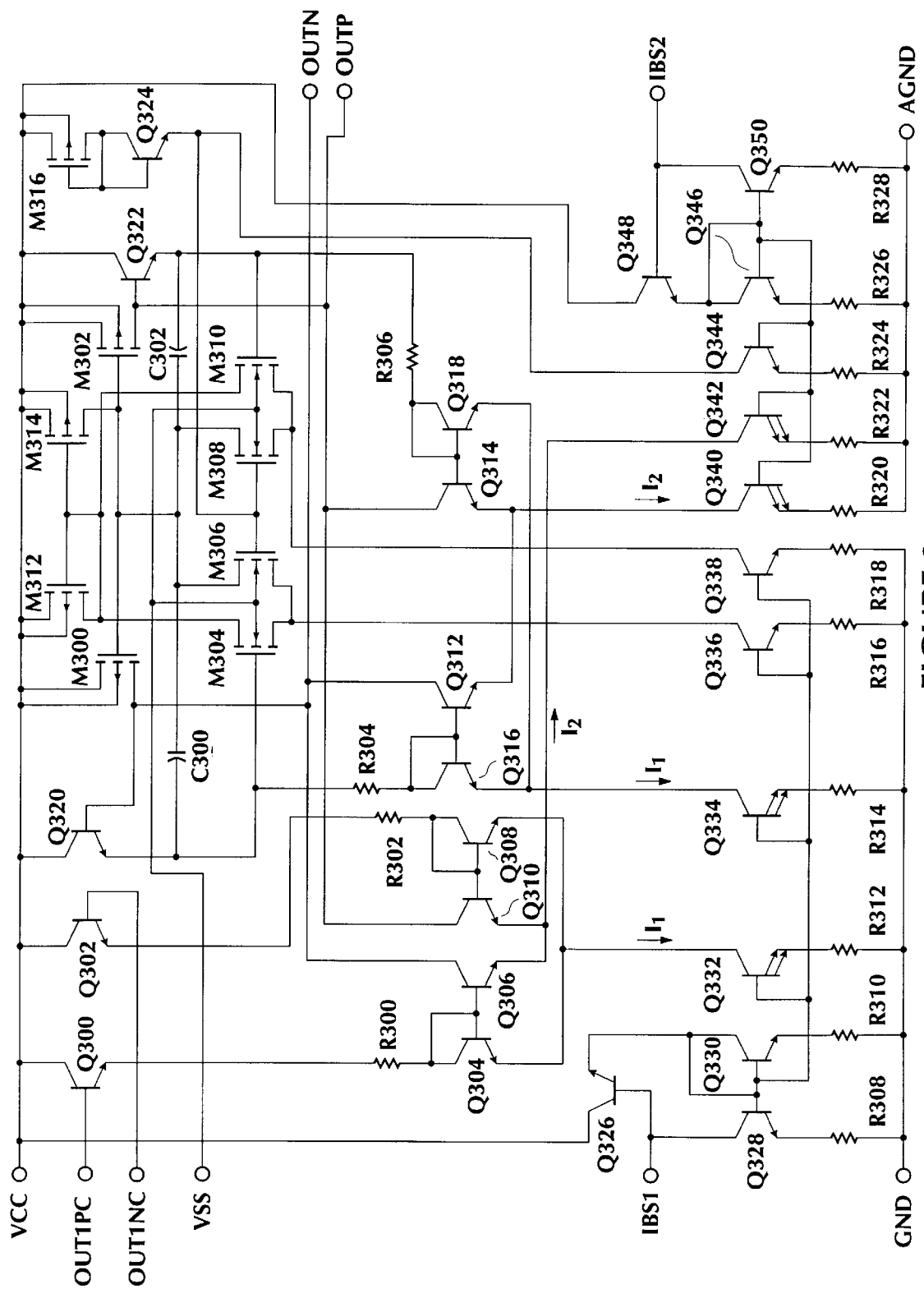
FIG. 9 shows a more detailed circuit schematic of the equalizer of FIG. 7 and in particular the double gm block of FIG. 4.
Figure 10:
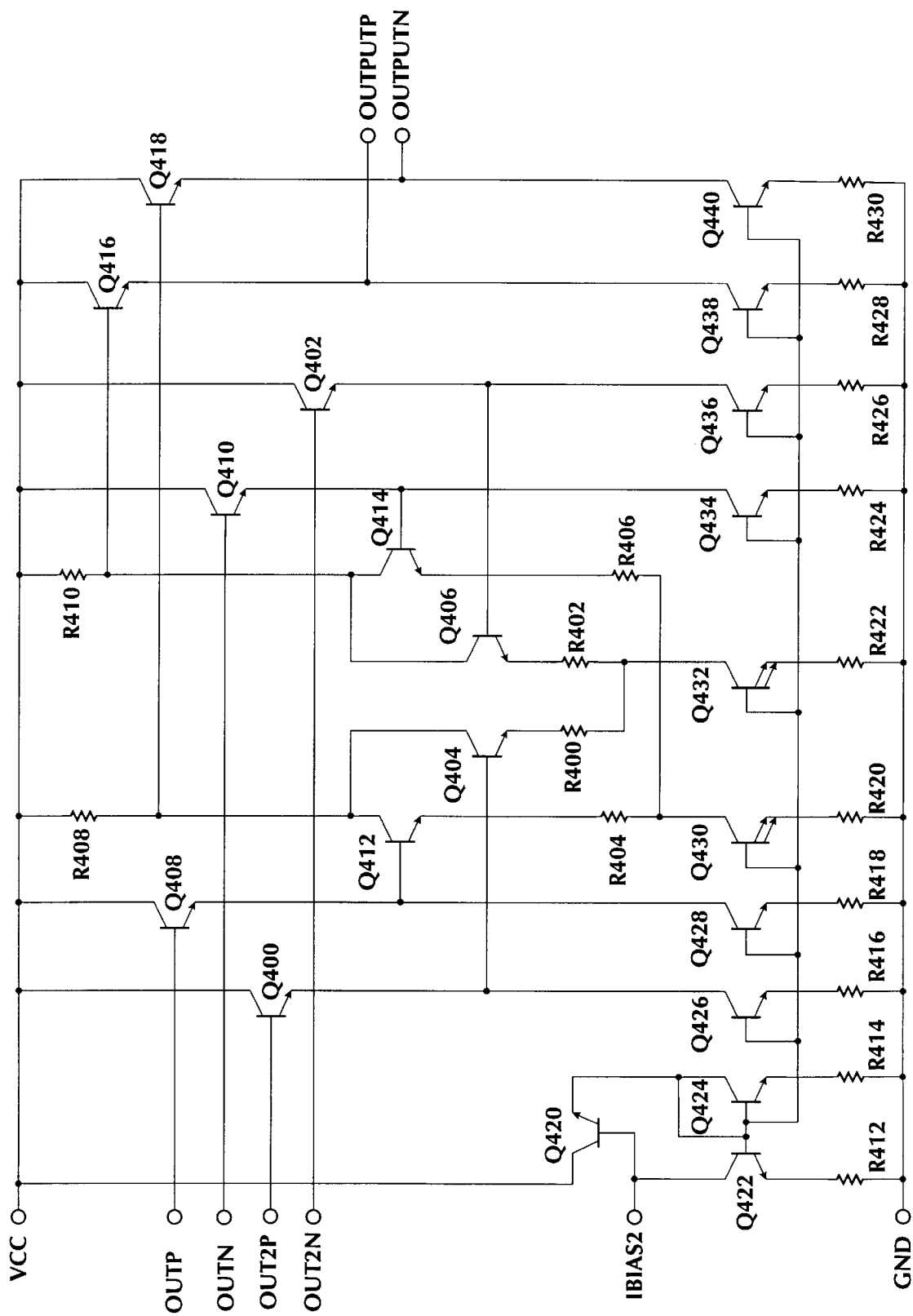
FIG. 10 shows a more detailed circuit schematic of the summer of FIG. 7.

FIG. 8 shows a circuit schematic for the preferred splitter circuit. All the transistors in FIGS. 8 and 10 are NPN bipolar transistors. All the transistors in FIG. 9 are NPN bipolar transistors unless otherwise noted.

In FIG. 8 the differential input voltage $V_{200}$ is coupled to the base of transistor Q200 and the base of transistor Q204. The collector of the transistor Q200 is coupled to the voltage supply Vcc. The emitter of the transistor Q200 is coupled to the base of the transistor Q208 and to the collector of the transistor Q246. The base of the transistor Q200 is also coupled to the emitter of the transistor Q202. The collector and base of the transistor Q202 are coupled to the emitter of the transistor Q208 and to a first terminal of a resistor R212. Similarly, the collector of the transistor Q204 is coupled to the voltage supply Vcc. The emitter of the transistor Q204 is coupled to the base of a transistor Q252 and the collector of a transistor Q244. The base of the transistor Q204 is coupled to the emitter of the transistor Q206. The base and the collector of the transistor Q206 are coupled to the emitter of the transistor Q252 and to the first terminal of a resistor R214. The second terminal of the resistor R212 and the resistor R214 are both coupled to the collector of a transistor Q254.

Three signals IC1, IC2 and CM are coupled from the controller 142 (FIG. 7, not shown here). The signal IC1 is coupled to the base of a transistor Q232 and to the first terminal of a resistor R202. The collector of the transistor Q232 is coupled to the voltage supply Vcc. The emitter of the transistor Q232 is coupled to the collector of a transistor Q242 and to the base of a transistor Q210. The other terminal of the resistor R202 is coupled to the emitter of a transistor Q228. The base and collector of the transistor Q228 are coupled to the voltage supply Vcc.

The signal IC2 is coupled to the base of a transistor Q230 and to the first terminal of a resistor R200. The collector of a transistor Q230 is coupled to the voltage supply Vcc. The emitter of the transistor Q230 is coupled to the collector of a transistor Q240 and to the base of a transistor Q212. The other terminal of the resistor R200 is coupled to the emitter of a transistor Q226. The base and collector of the transistor Q226 are coupled to the voltage supply Vcc.

The signal CM is coupled to the base and collector of a transistor Q264, to the emitter of a transistor Q262 and to the collector of a transistor Q248. The emitter of the transistor Q264 is coupled to the base of the transistor Q262 and to the voltage supply Vcc. The collector of the transistor Q262 is also coupled to the voltage supply.

The collector of the transistor Q208 is coupled to the base of a transistor Q214, to the base of a transistor Q218 and to the emitter of a transistor Q226. The collector of the transistor Q226 is coupled to the voltage supply Vcc. The emitter of the transistor Q214 is coupled to the emitter of a transistor Q216 and to the collector of the transistor Q210. The collector of the transistor Q214 is coupled to the first terminal of a resistor R204 and to the base of a transistor Q224. The other terminal of the resistor R204 is coupled to the voltage supply Vcc. The collector of the transistor Q216 is coupled to a first terminal of a resistor R206 and to the base of a transistor Q260. The other terminal of the resistor R206 is coupled to the voltage supply Vcc. The base of the transistor Q266 is coupled to the base of a transistor Q222 and to the voltage supply Vcc. The collector of the transistor Q222 is also coupled to the voltage supply Vcc. The emitter of the transistor Q222 is coupled to the base of the transistor Q216, to the base of a transistor Q220 and to the collector of the transistor Q252.

The emitter of the transistor Q210 is coupled to the emitter of the transistor Q212 and to the collector of a transistor Q250. The collector of the transistor Q212 is coupled to the emitters of transistors Q218 and Q220. The collector of the transistor Q218 is coupled to a first terminal of a resistor R208 and as the output OUT2P. The collector of the transistor Q220 is coupled to a first terminal of a resistor R210 and to the output OUT2N. The outputs OUT2P and OUT2N are that portion of the input voltage $V_{200}$ intended for the path 146 (FIG. 7, not shown here).

The second terminal of the resistor R208 and the second terminal of the resistor R210 are each coupled to the voltage supply Vcc. The collector of the transistor Q224 is coupled to the voltage supply Vcc. The emitter of the transistor Q224 is coupled to the collector of a transistor Q256 and to the output OUT1PC. The collector of the transistor Q260 is coupled to the voltage supply Vcc. The emitter of the transistor Q260 is coupled to the collector of the transistor Q258 and the Output OUT1NC. The outputs OUT1PC and OUT1NC are destined for the upper path in the block diagram of FIG. 7.

The circuit of FIG. 8 has bias current circuits as follows. A current biasing voltage IBIAS is coupled to the base of a transistor Q234 and to the collector of a transistor Q236. The collector of the transistor Q234 is coupled to the supply voltage Vcc. The emitter of the transistor Q234 is coupled to the base and the collector of a transistor Q238 to the base of the transistor Q236 and to the bases of the transistors Q240, 242, 244, 246, 248, 250, 254, 256 and Q258. Transistors Q248, Q250, Q256 and Q258 all have double emitters which are coupled together. Transistor Q254 has a quad emitter which are all coupled together. Reference to the emitter of these circuits includes all the parallel emitters as well.

The emitter of the transistor Q236 is coupled to a first terminal of a resistor R216. The emitter of the transistor Q238 is coupled to the first terminal of a resistor R218. The emitter of the transistor Q240 is coupled to a first terminal of a resistor R220. The emitter of the transistor Q242 is coupled to the first terminal of a resistor R222. The emitter of the transistor Q244 is coupled to the first terminal of a resistor R224. The emitter of the transistor Q246 is coupled to a first terminal of a resistor R226. The emitter of the transistor Q248 is coupled to a first terminal of a resistor R228. The emitter of the transistor Q250 is coupled to a first terminal of a resistor R230. The emitter of the transistor Q254 is coupled to a first terminal of a resistor R232. The emitter of the transistor Q256 is coupled to a first terminal of a resistor R234. The emitter of the transistor Q258 is coupled to a first terminal of a resistor R236. The second terminal of the resistors R216, R218, R220, R222, R224, R226, R228, R230, R232, R234 and R236 are all coupled together and to the circuit ground.

FIG. 9 shows the two transconductance equalizer stage of FIG. 7 such as shown in FIG. 4. OUT1PC and OUT1NC from the splitter circuit of the FIG. 8 are coupled as inputs to the circuit of FIG. 9. OUT1PC is coupled to the base of a transistor Q300. OUT1NC is coupled to the base of a transistor Q302. The collectors of the transistors Q300 and Q302 are coupled to the supply voltage Vcc. The emitter of the transistor Q300 is coupled to a first terminal of a resistor R300. The other terminal of the resistor R300 is coupled to the collector and base of a transistor Q304 and to the base of a transistor Q306. The emitter of the transistor Q302 is coupled to the first terminal of a resistor R302. The other terminal of the resistor R302 is coupled to the collector and the base of a transistor Q308 and to the base of a transistor Q310.

The collector of the transistor Q306 is coupled to the base of a transistor Q320, to the drain of a P-channel MOS transistor M300 to the collector of a transistor Q312 and as an output of the circuit OUTN. The base of the transistor Q312 is coupled to the base and the collector of a transistor Q316 and to a first terminal of a resistor R304. The other terminal of the resistor R304 is coupled to the emitter of the transistor Q320 to a first terminal of a capacitor C300 and to the gate of an N-channel MOS transistor M304. The source of the transistor M304 is coupled to the source of an N-channel MOS transistor M306 and to the collector of a transistor Q336. The substrate contact for the transistors M304 and M306 are coupled to a back bias voltage Vss.

The collector of the transistor Q310 is coupled to the base of a transistor Q322 to the drain of a P-channel MOS transistor M302 to the collector of a transistor Q314 and as an output of the circuit OUTP. The base of the transistor Q314 is coupled to the base and collector of a transistor Q318 and to a first terminal of a resistor R306. The other terminal of the resistor R306 is coupled to the emitter of the transistor Q322 to a first terminal of a capacitor C302 and to the gate of an N-channel MOS transistor M310. The source of the transistor M310 is coupled to the source of an N-channel MOS transistor M308 and to the collector of a transistor 0338. The substrate of the transistors M308 and M310 are coupled to the back bias voltage Vss. The second terminal of the capacitor C300 is coupled to the drain terminal of the transistors M306 and M308, to the second terminal of the capacitor C302, to the gates of the transistors M300 and M302 and to the drain of a P-channel MOS transistor M314. The source and back bias of the transistors M300 and M302 are all coupled to the supply voltage Vcc.

The drain of the transistor M304 is coupled to the drain of the transistor M310, to the source of a P-channel transistor M302 and to the gates of the transistors M302 and M314. The sources and substrate contacts of the transistors M312 and M314 are coupled to the supply voltage Vcc. The collectors of the transistors Q320 and Q322 are coupled to the supply voltage Vcc. The gates of the transistors M306 and M308 are each coupled to the emitter of a transistor Q324 and to the collector of a transistor Q344. The base of the transistor Q324 is coupled to its collector and to the drain and gate of a P-channel MOS transistor M316. The source and the substrate of the transistor M316 are coupled to the supply voltage Vcc.

The circuit of FIG. 9 includes current supplies for biasing the operation of the circuit. A first biasing voltage IBS1 is coupled to the base of a transistor Q326 and the collector of a transistor Q328. The collector of the transistor Q326 is coupled to the supply voltage Vcc. The emitter of the transistor Q326 is coupled to the collector and base of a transistor Q330, to the base of the transistor Q328 and to the bases of the transistors Q332, Q334, Q336 and Q338.

The emitter of the transistor Q304 is coupled to the emitter of the transistor Q308 and the collector of the transistor Q332. The emitter of the transistor Q306 is coupled to the emitter of the transistor Q310 and to the collector of a transistor Q342. The emitter of the transistor Q316 is coupled to the collector of the transistor Q334 and to the emitter of the transistor Q318. The emitter of the transistor Q312 is coupled to the emitter of the transistor Q314 and to the collector of the transistor Q340.

A second biasing voltage IBS2 is coupled to the base of the transistor Q348 and to the collector of a transistor Q350. The collector of the transistor Q348 is coupled to the supply voltage Vcc. The emitter of the transistor Q348 is coupled to the collector and base of a transistor Q346, and the bases of the transistors Q350, Q344, Q342 and Q340. The emitters of the transistors Q332, Q334, Q340 and Q342 are double emitter circuits. When the emitters of these transistors are referred to, it will be assumed that the double emitters are being discussed.

The emitter of the transistor Q328 is coupled to a first terminal of the resistor R308. The emitter of the transistor Q330 is coupled to a first terminal of a resistor R310. The emitters of the transistors Q332, Q334, Q336, Q338, Q340, Q342, Q344, Q346 and Q350 are coupled to a first terminal of the resistors R312, R314, R316, R318, R320, R322, R324, R326 and R328, respectively. The second terminal of the resistors R308, R310, R312, R314, R316, R318, R320, R322, R324, R326 and R328 are all coupled to ground. Depending upon the biasing voltage and appropriate current sources for controlling the circuit of FIG. 9, it may possible that the voltages IBS1 and IBS2 are equivalent. Further, these biasing voltages may be equivalent to the voltage IBIAS of FIG. 8.

FIG. 10 shows a detailed circuit schematic of the summer circuit 148 of FIG. 7. The outputs OUT2P and OUT2N of FIG. 8 are coupled as inputs to the circuit of FIG. 10. Similarly, the outputs OUTP and OUTN OF FIG. 9 are also coupled as inputs. OUT2P is coupled to the base of the transistor Q400. The collector of the transistor Q400 is coupled to the voltage supply Vcc. The signal OUT2N is coupled to the base of the transistor Q402. The collector of the transistor Q402 is coupled to the supply voltage Vcc. The emitter of the transistor Q400 is coupled to the base of a transistor Q404 and to the collector of a transistor Q426. The emitter of the transistor Q402 is coupled to the collector of a transistor Q436 and to the base of a transistor Q406. The collector of the transistor Q404 is coupled to the collector of a transistor Q412, to the base of a transistor Q418 and to a first terminal of a resistor R408. The other terminal of the resistor R408 is coupled to the supply voltage Vcc. The collector of the transistor Q418 is also coupled to the supply voltage Vcc. The emitter of the transistor Q418 is coupled to the output of the circuit output OUTPUTN.

The collector of the transistor Q406 is coupled to the collector of a transistor Q414, to the base of a transistor Q416 and to the first terminal of a resistor R410. The second terminal of the resistor R410 is coupled to the supply voltage Vcc. The collector of the transistor Q416 is coupled to the supply voltage Vcc. The emitter of the transistor Q416 is coupled to the output OUTPUTP.

The OUTP signal from the circuit of FIG. 9 is coupled to the base of a transistor Q408. The collector of the transistor Q408 is coupled to the supply voltage Vcc. The emitter of the transistor Q408 is coupled to the base of the transistor Q412 and to the collector of a transistor Q428. The OUTN signal from the circuit of FIG. 9 is coupled to the base of a transistor Q410. The collector of the transistor Q410 is coupled to the supply voltage Vcc. The emitter of the transistor Q410 is coupled to the base of the transistor Q414 and to the collector of a transistor Q434.

The circuit of FIG. 10 includes current supplies for biasing the circuit. A bias voltage IBIAS2 is coupled to the base of a transistor Q420 and to the collector of a transistor Q422. The collector of the transistor Q420 is coupled to the voltage supply Vcc. The emitter of the transistor Q420 is coupled to the collector and the base of a transistor Q424 and to the bases of the transistor Q422, Q426, Q428, Q430, Q432, Q434, Q436, Q438 and Q440.

The collector of the transistor Q430 is coupled to a first terminal of resistors R404 and R406. The other terminal of the resistor R404 is coupled to the emitter of the transistor Q412. The other terminal of the resistor R406 is coupled to the emitter of the transistor Q414. The collector of the transistor Q432 is coupled to a first terminal of the resistors R400 and R402. The second terminal of the resistor R400 is coupled to the emitter of the transistor Q404. The second terminal of the resistor R402 is coupled to the emitter of the transistor Q406. The collector of the transistor Q438 is coupled to the output OUTPUTP of the circuit of FIG. 10. The collector of the transistor Q440 is coupled to the output terminal output OUTPUTN. The emitters of the transistors Q422, Q424, Q426, Q428, Q430, Q432, Q434, Q436, Q438 and Q440 are each coupled to a first terminal of a resistor R412, R414, R416, R418, R420, R422, R424, R426, R428 and R430, respectively. The second terminal of the resistors R412, R414, R416, R418, R420, R422, R424, R426, R428 and R430 are all coupled to ground. Note that the emitters of transistors Q430 and Q432 are double emitters.

Figure 11:
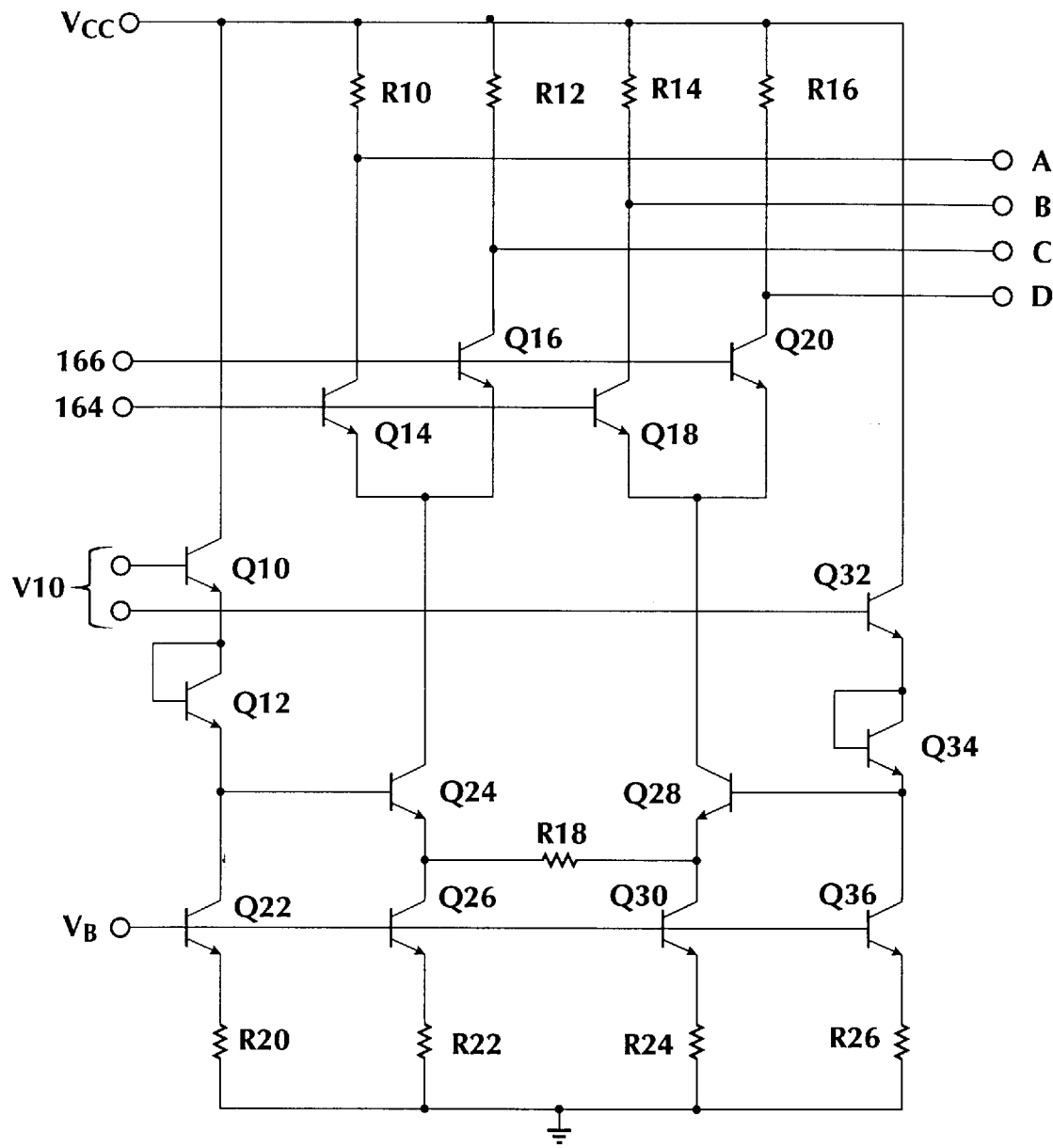
FIG. 11 shows a detailed circuit schematic diagram of an alternate embodiment of the splitter portion of the circuit of FIG. 7.
Figure 12:
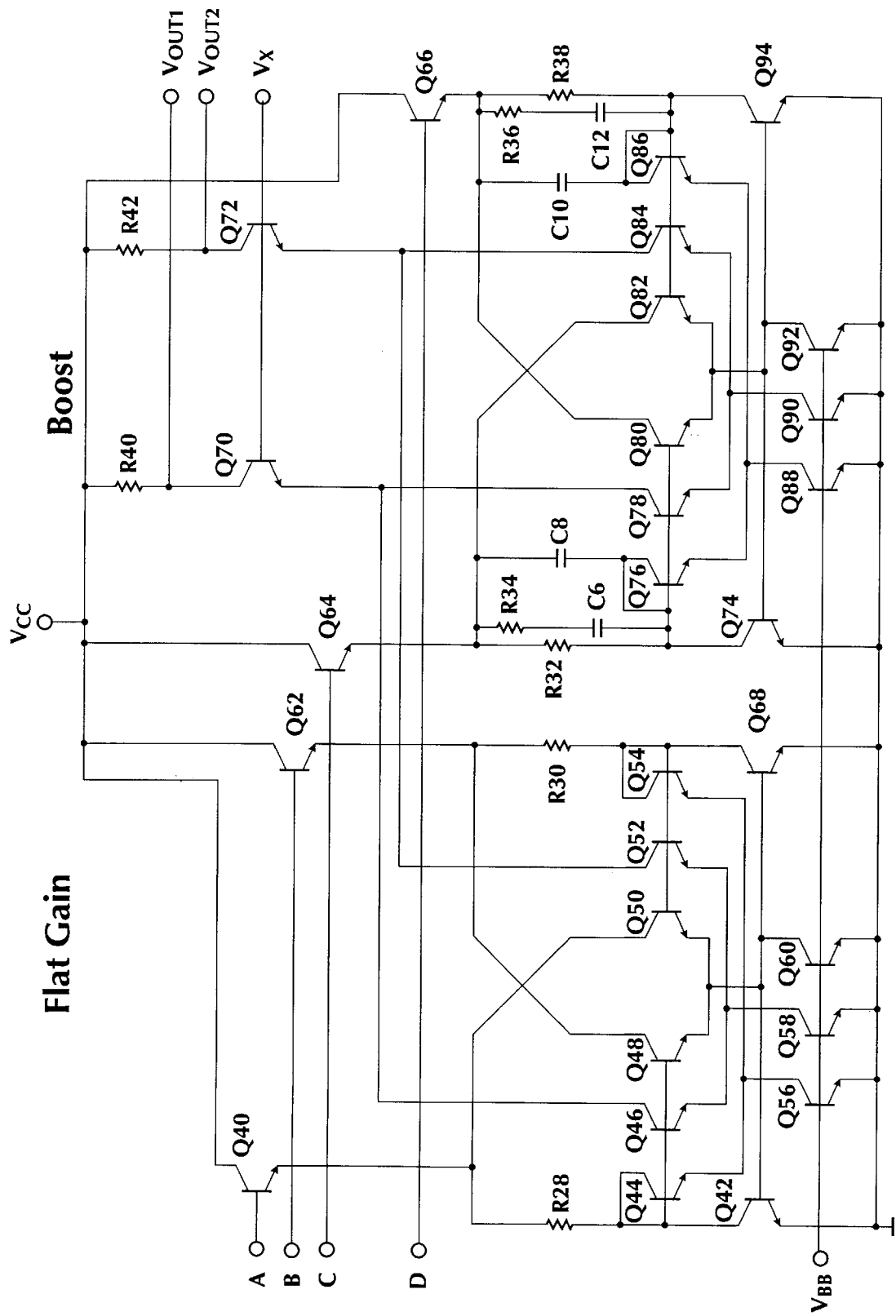
FIG. 12 shows a detailed circuit schematic diagram of an alternate embodiment of the equalizer portion of the circuit of FIG. 7.

FIGS. 11 and 12 together show a more detailed circuit diagram of an alternate implementation for achieving the portions of the block diagram of FIG. 7 including the splitter and the upper path 144. All transistors in FIGS. 11 and 12 are NPN bipolar transistors. In FIG. 11, the input voltage $V_{10}$ is coupled to the base of transistors Q10 and Q32. The collectors of the transistors Q10 and Q32 are coupled to the supply voltage Vcc. The supply voltage Vcc is also coupled to one terminal each of four resistors R10, R12, R14 and R16. The adaptive control circuit (142 FIG. 7, not shown here) is configure to provide two control signals to the circuit of FIG. 11. A first control terminal 164 is coupled to the bases of transistors Q14 and Q18. A second control terminal 166 is coupled to the bases of the transistors Q16 and Q20.

The collector of the transistor Q14 is coupled to the second terminal of the resistor R10 and to the terminal A. (The terminals A, B, C and D are merely for showing connections from the circuit of FIG. 11 to the circuit of FIG. 12.) The collector of the transistor Q16 is coupled to the second terminal of the resistor R12 and to the terminal C. The collector of the transistor Q18 is coupled to the second terminal of the resistor R14 and to the terminal B. The collector of the transistor Q20 is coupled to the second terminal of the resistor R16 and to the terminal D.

The emitter of the transistor Q10 is coupled to the collector and the base of the transistor Q12. The emitter of the transistor Q12 is coupled to the base of the transistor Q24 and to the collector of the transistor Q22. The emitter of the transistor Q32 is coupled to the collector and the base of the transistor Q34. The emitter of the transistor34 is coupled to the base of the transistor Q28 and to the collector of the transistor Q36. The emitters of the transistors Q14 and Q16 are coupled together and to the collector of the transistor Q24. The emitters of the transistors Q18 and Q20 are coupled together and to the collector of the transistor Q28. The emitter of the transistor Q24 is coupled to the first terminal of a resistor R18 and to the collector of a transistor Q26. The emitter of the transistor Q28 is coupled to the second terminal of the resistor R18 and to the collector of a transistor Q30. The bases of the transistors Q22, Q26, Q30 and Q36 are all coupled be controlled by a bias voltage $V_B$. The emitter of the transistor Q22 is coupled to a first terminal of a resistor R20. The second terminal of the resistor R20 is coupled to ground. The emitter of the transistor Q26 is coupled to a first terminal of a resistor R22. The second terminal of the resistor R22 is coupled to ground. The emitter of the transistor Q30 is coupled to a first terminal of a resistor R24. The second terminal of the resistor R24 is coupled to ground. The emitter of the transistor Q36 is coupled to a first terminal of a resistor R26. The second terminal of the resistor R26 is coupled to ground.

In FIG. 12, the inputs A and B are coupled to the first equalizer stage including $gm_3$ and $gm_4$ of the upper path (144 in FIG. 7, not shown here). Input A is coupled to the base of a transistor Q40. The collector of the transistor Q40 is coupled to the voltage supply Vcc. The emitter of the transistor Q40 is coupled to the collector of the transistor Q50 and to the first terminal of a resistor R28. The second terminal of the resistor R28 is coupled to the collector of the transistor Q42 and to the base and the collector of the transistor Q44, as well as the bases of the transistors Q46 and Q48. Input B is coupled to the base of a transistor Q62. The collector of the transistor 062 is coupled to the voltage supply Vcc. The emitter of the transistor Q62 is coupled to the collector of the transistor Q48 and to the first terminal of a resistor R30. The second terminal of the resistor R30 is coupled to the collector of the transistor Q68 and to the base and the collector of the transistor Q54, as well as the bases of the transistors Q50 and Q52.

The emitters of the transistors Q44 and Q54 are coupled together and to the collector of the transistor Q56. The emitters of the transistors Q46 and Q52 are coupled together and to the collector of the transistor Q58. The emitters of the transistors Q48 and Q50 are coupled together, to the collector of the transistor Q60 and to the bases of the transistors Q42 and Q68. The emitters of the transistors Q42, Q56, Q58, Q60 and Q68 are all coupled to ground.

The inputs C and D are coupled to the second equalizer stage including $gm_5$ and $gm_6$ of the upper path (144 in FIG. 7, not shown here). The input C is coupled to the base of the transistor Q64. The collector of the transistor Q64 is coupled to the voltage supply Vcc. The emitter of the transistor Q64 is coupled to a first terminal of a resistor R32, the a first terminal of a resistor R34, to the first terminal of a capacitor C8 and to the collector of the transistor Q82. The second terminal of the resistor R32 is coupled to the collector of the transistor Q74, to the first terminal of a capacitor C6, to the second terminal of the capacitor C8, to the base and the collector of the transistor Q76 and to the bases of the transistors Q78 and Q80. The second terminal of the resistor R34 is coupled to the second terminal of the capacitor C6.

The input D is coupled to the base of the transistor Q66. The collector of the transistor Q66 is coupled to the voltage supply Vcc. The emitter of the transistor Q66 is coupled to a first terminal of a resistor R38, the a first terminal of a resistor R36, to the first terminal of a capacitor C10 and to the collector of the transistor Q80. The second terminal of the resistor R38 is coupled to the collector of the transistor Q94, to the first terminal of a capacitor C12, to the second terminal of the capacitor C10, to the base and the collector of the transistor Q86 and to the bases of the transistors Q84 and Q82. The second terminal of the resistor R36 is coupled to the second terminal of the capacitor C12.

The emitters of the transistors Q76 and Q86 are coupled together and to the collector of the transistor Q88. The emitters of the transistors Q78 and Q84 are coupled together and to the collector of the transistor Q90. The emitters of the transistors Q80 and Q82 are coupled together, to the collector of the transistor Q92 and to the bases of the transistors Q74 and Q94. The emitters of the transistors Q74, Q88, Q90, Q92 and Q94 are all coupled to ground. The bases of the transistors Q56, Q58, Q60, Q88, Q90 and Q92 are all coupled to be controlled by a bias voltage $V_{BB}$. Note that the bias voltage $V_B$ shown in FIG. 11 and the bias voltage $V_{BB}$ of FIG. 12 can be the same voltage.

The collectors of the transistors Q46 and Q78 are coupled to the emitter of the transistor Q70. The collectors of the transistors Q52 and Q84 are coupled to the emitter of the transistor Q72. The bases of the transistors Q70 and Q72 are coupled to be controlled by a bias voltage $V_x$. The collector of the transistor Q70 is coupled to the first terminal of a resistor R40 and to a first output $V_{OUT1}$. The second terminal of the resistor R40 is coupled to the voltage supply Vcc. The collector of the transistor Q72 is coupled to the first terminal of a resistor R42 and to a first output $V_{OUT2}$. The second terminal of the resistor R42 is coupled to the voltage supply Vcc. Naturally, it will be apparent to one of ordinary skill in the art that other circuit representations can be designed to implement the functions contained in FIGS. 11 and 12.

Figure 13:
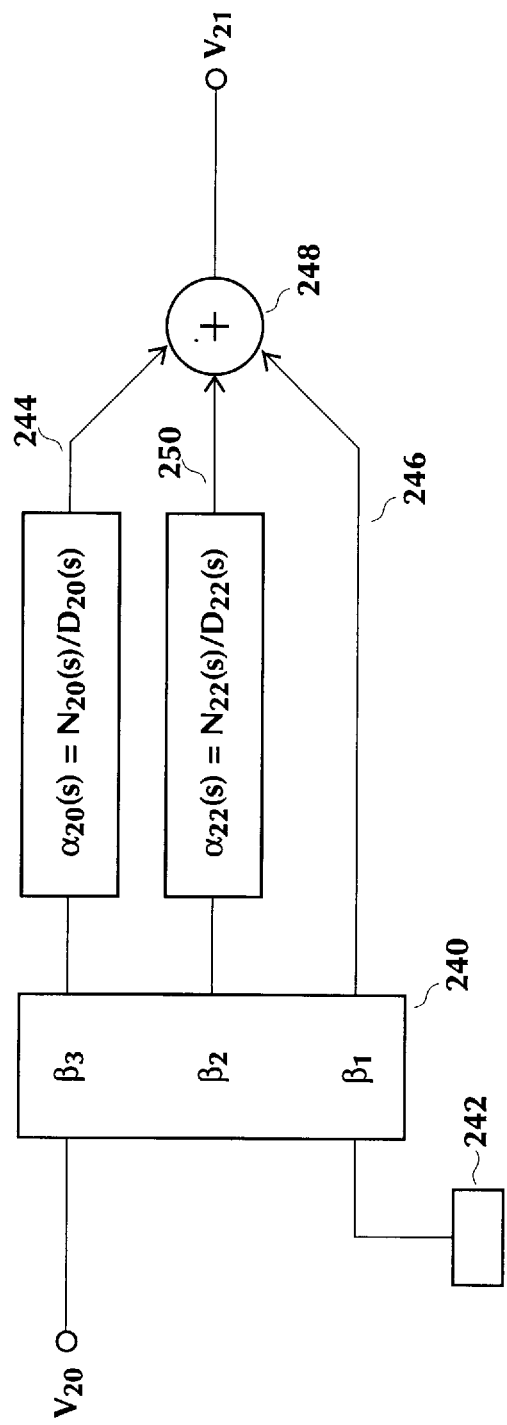
FIG. 13 is a block diagram of an alternate embodiment of the invention.
Figure 14:
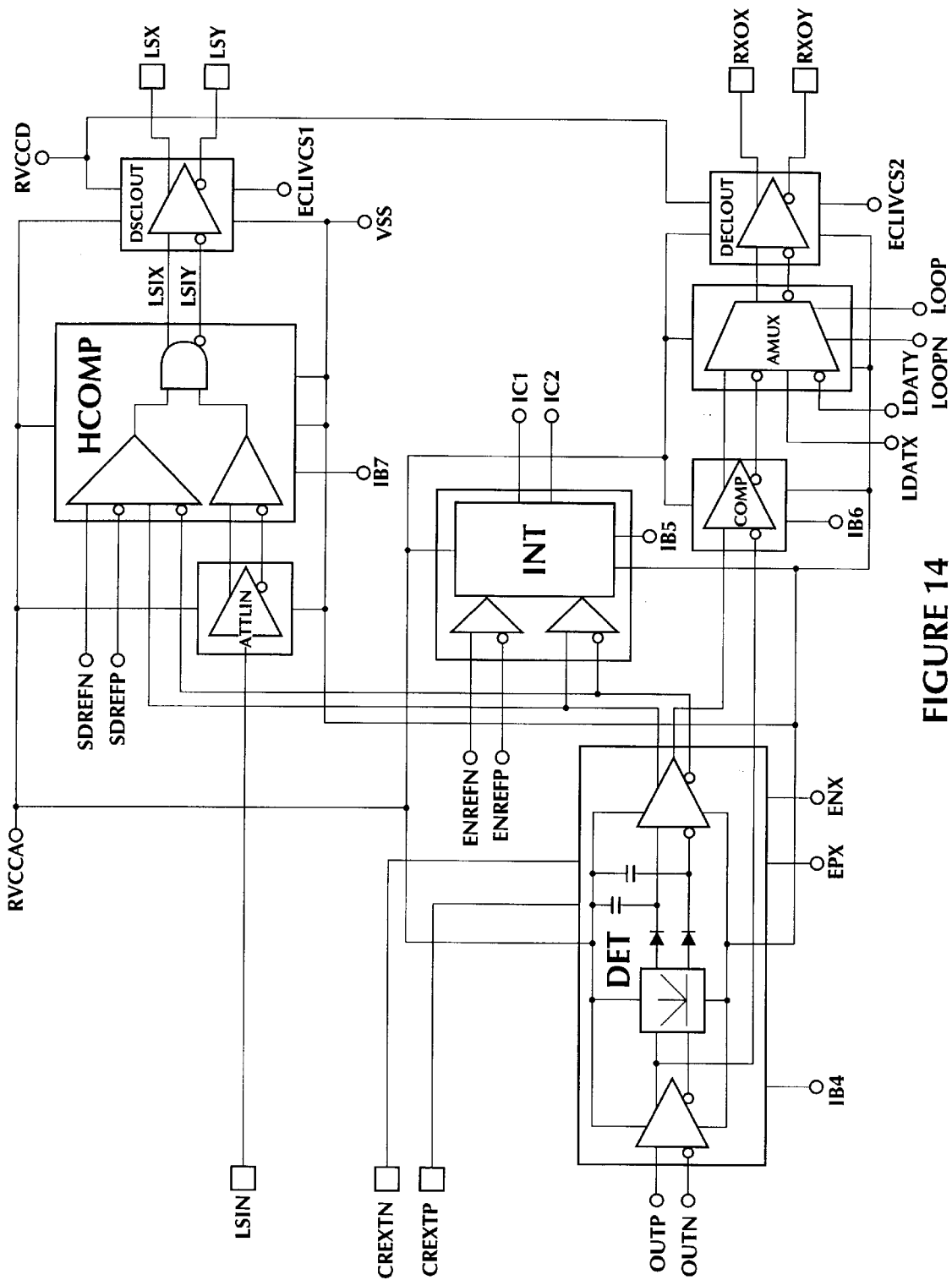
FIG. 14 is a detailed design schematic for a portion of the circuit of FIG. 11.
Figure 15:
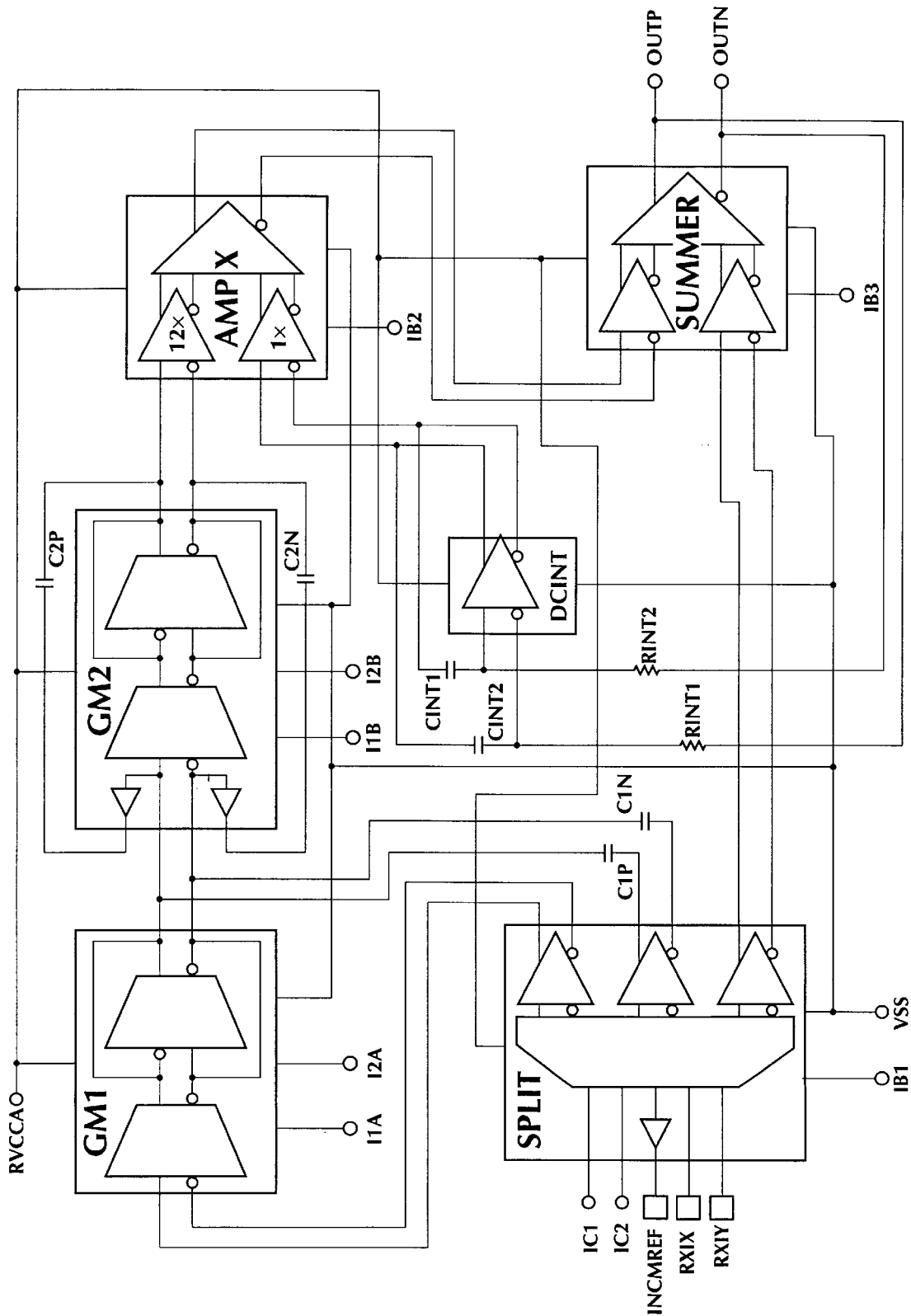
FIG. 15 is a detailed design schematic for a portion of the circuit of FIG. 11.

FIG. 13 shows an alternate embodiment of the present invention. The degraded voltage signal $V_{20}$ from the signal cable is coupled to the input of the splitter 240. Under control of the adaptive control circuit 242, the splitter 240 splits the voltage signal $V_{20}$ pursuant to a function of the length of the cable and applies the signal to one each of three reconstruction paths. The reconstruction along each of the paths in adjusted for optimization for a particular length of cable. Note that the optimization may not necessarily be the inverse transfer function of the anticipated signal degradation for that length of cable in view of the multiple path correction system. For example, the adjustment along the upper path 244 is a function of $a_{20}$ which is proportional to the ratio $N_{20}(s)/D_{20}(s)$. Similarly, the adjustment along the middle path 250 is a function of $a_{22}$ which is proportional to the ratio $N_{22}(s)/D_{22}(s)$. The portion of the input signal $V_{20}$ which is coupled to the lower path 246 is not adjusted in this example. The partial reconstructions from the upper path 244, the middle path 250 and the lower path 246 are summed in the summing circuit 248 for form the reconstructed voltage signal $V_{22}$. The circuit of FIG. 13 can be represented by the equation:

$$\frac{V_{21}}{V_{20}} = \sum_{i=1}^{3} \beta_i \frac{N_i(s)}{D_i(s)}$$

where $\beta_i$ represents the portion of the input signal coupled to each of the i reconstruction paths. In the event that additional paths are provided for reconstructing a signal, the $$\frac{V_{output}}{V_{input}} = \sum_{i=1}^{n} \beta_i \frac{N_i(s)}{D_i(s)}$$

equation representing FIG. 13 can be generalized as follows: where n=the number of paths in the reconstruction circuit. An integrated circuit incorporating the features of the present invention was developed by Micro Linear Corporation of San Jose Calif. Appendix A includes an advance confidential data sheet for Micro Linear Corporation transceiver product designated ML6671 which is designed to operate at 125 Mbaud over 100 meters of Category 5 unshielded twisted Pair signal cable. FIGS. 15 and 16 are block diagram design schematics used by Micro Linear Corporation in designing the ML6671 circuit. There exist other approaches, some of which provide better results at lower frequencies. However, the present invention provides an inexpensive integrated solution for data rates in excess of 10 Mbits/sec.

Modifications and improvements to this invention which become clear to persons of ordinary skill in the art after reading this specification, the drawings and the appended claims are deemed within the spirit and scope of the present invention.

I claim:

1. An adaptive equalizer comprising:
   a. means for receiving an input signal;
   b. means for variable splitting the input signal over a continuous range of signal portions into a first partial signal and a second partial signal;
   c. means for adjusting the first partial signal according to a predetermined first function for forming a reconstructed first partial signal; and
   d. means for summing the reconstructed first partial signal and the second partial signal for forming an equalized reconstructed output signal.

2. The adaptive equalizer according to claim 1 wherein the means for splitting divides the input signal into the first partial signal and the second partial signal according to a predetermined relationship to a signal cable length.

3. The adaptive equalizer according to claim 2 wherein the means for splitting divides the input signal into portions related to M for the first partial signal and 1-M for the second partial signal.

4. The adaptive equalizer according to claim 3 wherein the means for adjusting the first partial signal follows the ratio N(s)/D(s) such that the ratio of the reconstructed output signal to the input signal follows the relationship:

$$\frac{V_{11}}{V_{10}} = M\left(\frac{N(s)}{D(s)}\right) + (1-M) = \frac{M(N(s) - D(s)) + D(s)}{D(s)}.$$

5. An adaptive equalizer comprising:
a. means for receiving an input signal;
b. means for variable splitting the input signal over a continuous range of signal portions into a first partial signal and a second partial signal;
c. means for adjusting the first partial signal according to a predetermined first function for forming a reconstructed first partial signal;
d. means for adjusting the second partial signal according to a predetermined second function for forming a reconstructed second partial signal; and
e. means for summing the reconstructed first partial signal and the second reconstructed partial signal for forming a reconstructed output signal.

6. The adaptive equalizer according to claim 5 wherein the means for splitting divides the input signal into the first partial signal and the second partial signal according to a predetermined relationship to a signal cable length.

7. The adaptive equalizer according to claim 6 wherein the means for splitting divides the input signal into portions related to M for the first partial signal and 1-M for the second partial signal.

8. The adaptive equalizer according to claim 7 wherein the means for adjusting the first partial signal follows the ratio N(s)/D(s) such that the ratio of the reconstructed output signal to the input signal follows the relationship:

$$\frac{V_{11}}{V_{10}} = M\left(\frac{N(s)}{D(s)}\right) + (1-M) = \frac{M(N(s) - D(s)) + D(s)}{D(s)}.$$

9. An adaptive equalizer comprising:
a. a splitter for receiving an input voltage signal;
b. an adaptive controller circuit for controlling the splitter to split the input voltage signal into a first partial signal and a second partial signal according to a predetermined relationship;
c. a first path coupled to receive the first partial signal having a first transconductor having a capacitive feedback, a second transconductor coupled to receive a first output signal from the first transconductor, the second transconductor having a zero impedance feedback path, a third transconductor coupled to receive a second output signal from the second transconductor, the third transconductor having a capacitive feedback, and a fourth transconductor coupled to receive a third output signal from the third transconductor; and
d. a summing circuit coupled to receive a fourth output signal from the fourth transconductor and coupled to receive the second partial signal for forming a reconstructed output signal.

10. The adaptive equalizer according to claim 9 wherein the means for splitting divides the input signal into the first partial signal and the second partial signal according to a predetermined relationship to a signal cable length.

11. The adaptive equalizer according to claim 10 wherein the means for splitting divides the input signal into portions related to M for the first partial signal and 1-M for the second partial signal.

12. The adaptive equalizer according to claim 11 wherein the means for adjusting the first partial signal follows the ratio N(s)/D(s) such that the ratio of the reconstructed output signal to the input signal follows the relationship:

$$\frac{V_{11}}{V_{10}} = M\left(\frac{N(s)}{D(s)}\right) + (1-M) = \frac{M(N(s) - D(s)) + D(s)}{D(s)}.$$

13. The adaptive equalizer according to claim 1 wherein the means for splitting divides the input signal into the first partial signal and the second partial signal according to a result of comparing the reconstructed output signal to a stored expected waveform.

14. The adaptive equalizer according to claim 3 wherein the value of M is determined by comparing the reconstructed output signal to a stored expected waveform.

15. The adaptive equalizer according to claim 5 wherein the means for splitting divides the input signal into the first partial signal and the second partial signal according to a result of comparing the reconstructed output signal to a stored expected waveform.

16. The adaptive equalizer according to claim 7 wherein the value of M is determined by comparing the reconstructed output signal to a stored expected waveform.

17. The adaptive equalizer according to claim 9 wherein the means for splitting divides the input signal into the plurality of partial signals according to a predetermined relationship to a signal cable length.

18. The adaptive equalizer according to claim 9 wherein the means for splitting divides the input signal into the plurality of partial signals according to a result of comparing the reconstructed output signal to a stored expected waveform.

19. The adaptive equalizer according to claim 9 wherein the means for splitting divides the input signal into the plurality of partial signals according to a predetermined relationship to a signal cable length.

* * * * *

UNITED STATES PATENT AND TRADEMARK OFFICE
CERTIFICATE OF CORRECTION

PATENT NO. : 5,828,700

DATED : Oct. 27, 1998

INVENTOR(S) : Thomas H. Korn

It is certified that error appears in the above-identified patent and that said Letters Patent is hereby correct as shown below:

Title page, item [56] insert the following:

In the title page insert --4,970,722  11/1990  Preschutti--.

In column 8, line 7, delete "transistor 0338" and insert --transistor Q338--.

In column 10, line 61, delete "transistor 062" and insert --transistor Q62--.

In column 14, line 50, delete "signal into the plurality of partial signals according to a predetermined relationship to a signal cable length" and insert --signal into the first partial signal and the second partial signal according to a result of comparing the reconstructed output signal to a stored expected waveform--.

Signed and Sealed this

Thirteenth Day of April, 1999

Attest:

Q. TODD DICKINSON

*Attesting Officer*  *Acting Commissioner of Patents and Trademarks*